United States Patent [19]

Hall et al.

[11] Patent Number: 5,116,128
[45] Date of Patent: May 26, 1992

[54] MIRROR TRANSDUCER ASSEMBLY FOR RING LASER GYROSCOPE

[75] Inventors: David B. Hall, La Crescenta; Shahrokh R. Farahani, Danville, both of Calif.

[73] Assignee: Litton Systems, Inc., Beverly Hills, Calif.

[21] Appl. No.: 631,372

[22] Filed: Dec. 18, 1990

[51] Int. Cl.⁵ .......................................... G01C 19/66
[52] U.S. Cl. .................................. 356/350; 372/107; 310/332
[58] Field of Search ...................... 356/350; 372/107; 310/332, 330, 317

[56] References Cited

U.S. PATENT DOCUMENTS

| | | | |
|---|---|---|---|
| 4,383,763 | 5/1983 | Hutchings et al. | 356/350 |
| 4,488,080 | 12/1984 | Baumann | 356/350 |
| 4,813,774 | 3/1989 | Dorschner . | |
| 4,818,087 | 4/1989 | Dorschner . | |
| 4,824,253 | 4/1989 | Butler et al. | 356/350 |
| 4,861,161 | 8/1989 | Ljung | 356/350 |
| 4,915,492 | 4/1990 | Toth | 356/350 |

OTHER PUBLICATIONS

Laser Applications; Monte Ross; Academic Press; 1971; pp. 133-200.
Multioscillator Laser Gyros; Weng W. Chow, et al.; IEEE Journal of Quantum Electronics, vol. QE-16, No. 9, Sep. 1980.

*Primary Examiner*—Samuel A. Turner
*Attorney, Agent, or Firm*—L. David Rish; M. Michael Carpenter

[57] ABSTRACT

Disclosed herein is a Pathlength Control Assembly for Ring Laser Gyroscope comprising, in a preferred embodiment, a mirror, coupled to a mirror housing including a mirror post, wherein the mirror is mounted on an axially deflectable membrane of the housing. A pair of piezoelectric transducers are responsive to an electronic input signal and mounted to a backing plate. The transducers are mounted within a driver housing and drive a driver post which is made from a thermally expansive material. As the backing plate is deformed to drive the mirror post to axially deflect the mirror membrane, the central driver post passively expands in response to temperature changes. In this manner, the transducers and thermally expansive mirror post act in conjunction to both actively and passively drive the mirror post over the full dynamic range of multioscillator or other ring laser gyroscope.

14 Claims, 6 Drawing Sheets

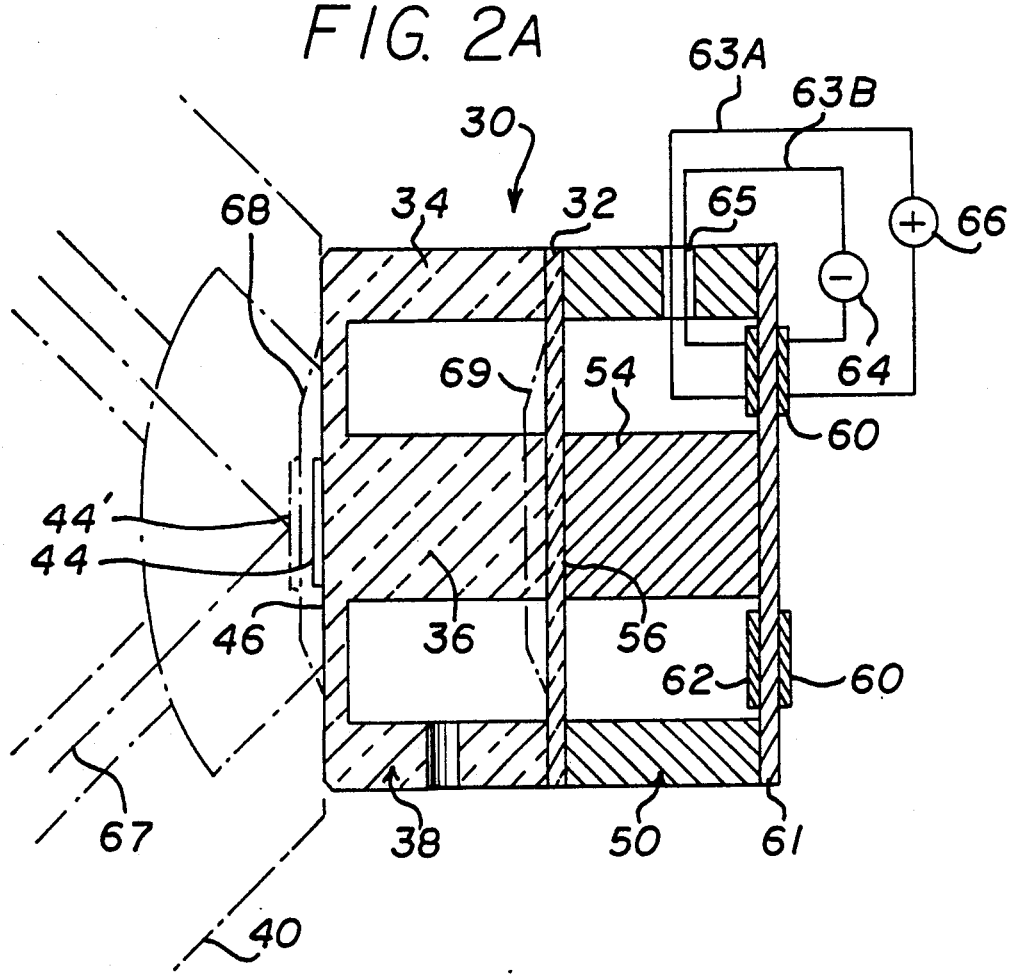
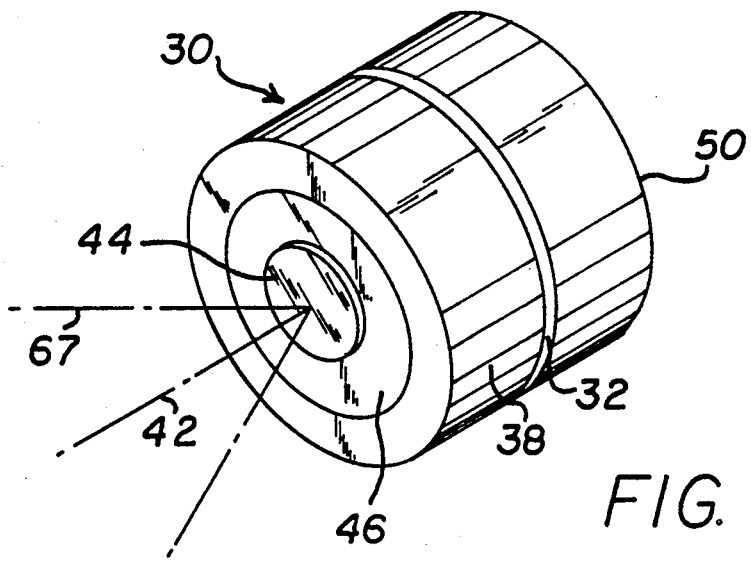

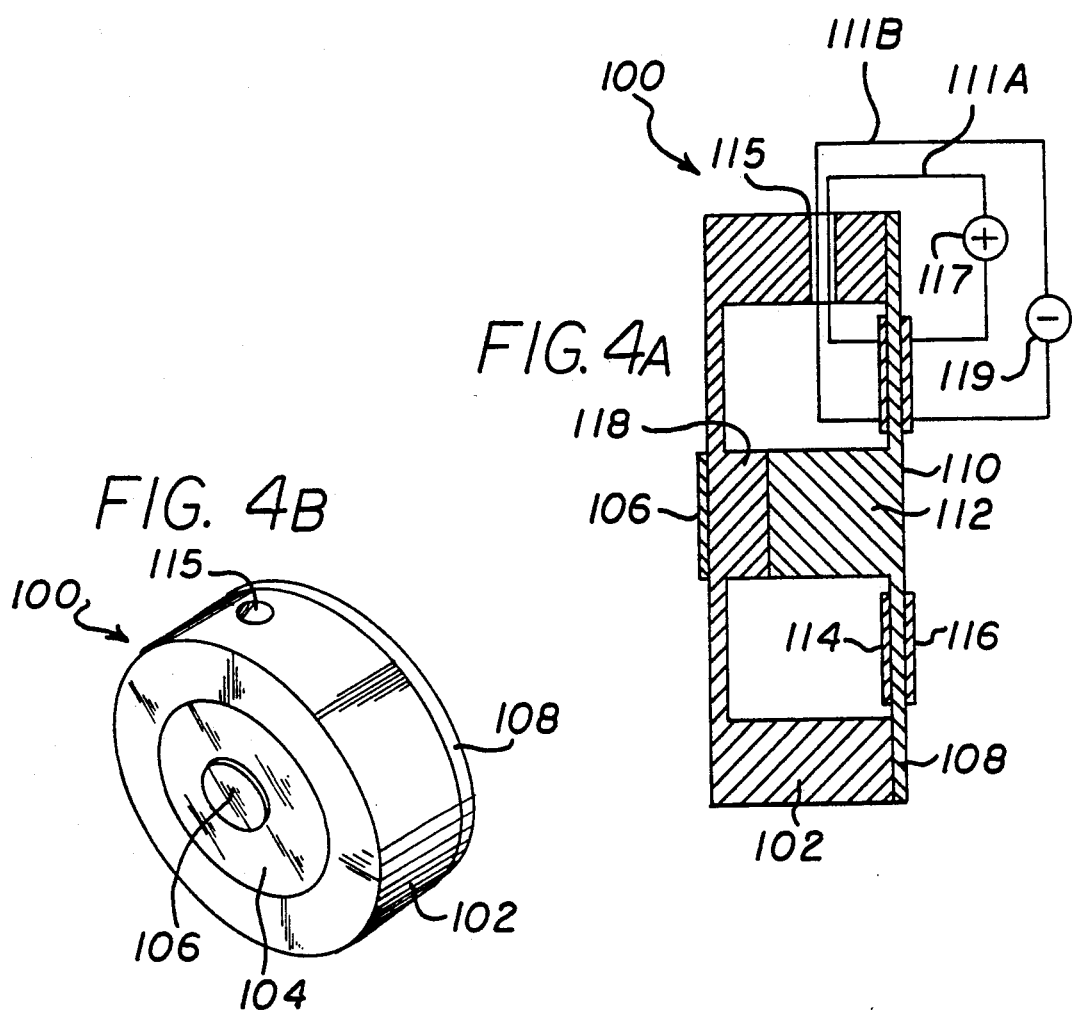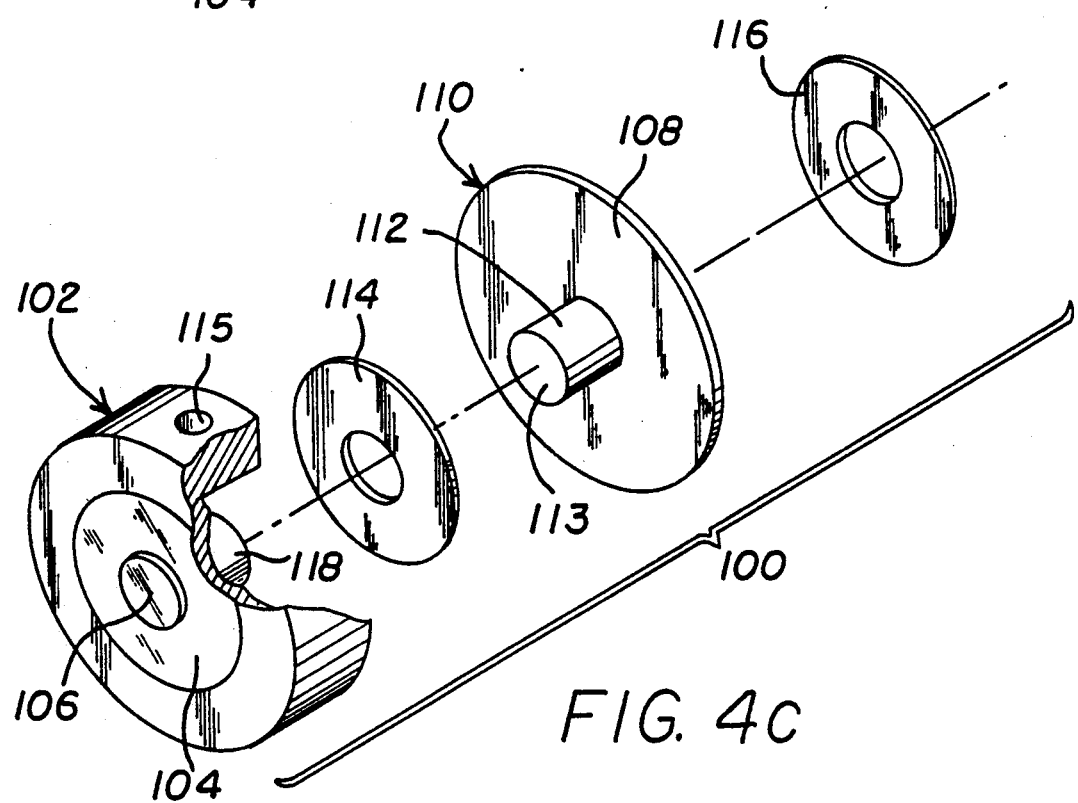

MIRROR TRANSDUCER ASSEMBLY FOR RING LASER GYROSCOPE

BACKGROUND OF THE INVENTION

1. Field of the Invention

This invention relates to a pathlength controller for a ring laser gyroscope and, more particularly, to an improved pathlength control assembly having certain thermally expansive components to allow the controller to achieve a relatively wide range of axial displacement to provide the greater range of dynamic mirror movement needed for a multioscillator ring laser gyroscope.

2. Description of Related Art

Ring laser gyroscopes are an alternative form of rotation sensors which do not require the use of a spinning mass characteristic of a mechanical gyroscope. A ring laser gyroscope employs a Sagnac effect to detect rotation optically, as an alternative to the inertial principles upon which a mechanical gyroscope operates. Planar ring laser gyroscopes, of both triangular and square geometries, have been used in inertial navigation systems and flight control systems regularly in both commercial and military aircraft. The primary advantage of the ring laser gyroscope over the spinning wheel mechanical gyroscope is its ability to withstand relatively large mechanical shock without permanent degradation of its performance. Because of this and other features the expected mean time between failures of most RLG inertial navigation systems are several times longer than the mechanical gyroscopes they replace. The planar ring laser gyroscope was a first attempt at a non-mechanical truly strap-down inertial navigation system.

The earliest developed ring laser gyroscopes have two independent counter-rotating light beams or other electromagnetic propagation which travel within an optical ring cavity. In an ideal model of the ring laser gyroscope, these two light beams propagate in a closed loop with transit times that differ in direct proportion to the rotation rate of the loop about an axis perpendicular to the plane of the loop. However, when one steps away from the ideal model of two mode ring laser gyroscope operation, various sources of inaccuracy are observed. Among these inaccuracies in rotational sensing of a two-mode planar ring laser gyroscope is the phenomenon known as frequency lock or mode locking. Reflections and backscatter from the intra-cavity element and instabilities of the magnetic field associated therewith cause difficulties such as mode locking that need to be overcome in order to build a fully optical navigational grade multioscillator ring laser gyroscope. Mode locking is a major difficulty at low rotation rates where the ring laser gyroscope produces a false indication that the device is not rotating. If the rotation rate of a ring laser gyroscope starts at a value above that of where lock-in occurs, and is then decreased, the frequency difference between the beams disappears at a certain input rotation. This input rotation rate is called the lock-in threshold. The range of rotation rates over which lock-in occurs is generally called the dead band of the ring laser gyroscope. Lock-in arises from the coupling of light between the beams. One means of overcoming the lock-in effect of the counter-propagating modes of light within a two mode gyroscope is to mechanically dither the mirrors or body of the gyroscope. This technique is known as rate biasing or mechanical dithering and prevents counter propagating waves from locking at low rotation rates. A more detailed explanation of the problems associated with a planar two mode gyroscope are described in Laser Applications, edited by Monte Ross, pages 133-200 (Academic Press, 1971).

Even the most effective mechanically dithered ring laser gyroscope adds a noise component to the output of the ring laser which in turn reduces its ultimate accuracy. Also, the presence of mechanical dither, either is mirror or full bodied dither, detracts from the desired goal of a fully strapped down inertial navigational unit. Since one of the primary benefits of a ring laser gyroscope is that it overcame the need for mechanical or moving parts, a body dithered planar two mode gyroscope does not truly meet this goal. In an effort to achieve a fully optical ring laser gyroscope, the non-planar multi-mode ring laser gyroscope was developed to overcome the effects of mode locking without the need to dither. The term (multioscillator) refers to four modes of electromagnetic energy that propagates simultaneously in the cavity as opposed to the usual pair counter-propagating linearly polarized modes that exist in the conventional two mode gyroscope. A detailed discussion of the operation of the multi-oscillator laser gyroscope is presented in the article entitled "*Multioscillator Laser Gyros*" by Weng W. Chow, et. al., at pages 918-936, *IEEE Journal of Quantum Electronics*, Vol. QE-16, No. 9, September 1980. An example of this theory of multioscillator ring laser gyroscope may also be found in U.S. Pat. No. 4,818,087 entitled "*ORTHOHEDRAL RING LASER GYRO*" issued Apr. 4, 1989 to Raytheon Corporation (Terry A. Dorschner, inventor); and U.S. Pat. No. 4,813,774 entitled "*SKEWED RHOMBUS RING LASER GYRO*" issued Mar. 21, 1989 to Raytheon Corporation (Terry A. Dorschner, et. al., inventor).

With reference to FIGS. 1A and 1B, the basic multi-oscillator ring laser gyroscope has an optical path 10 formed between four mirrors 12, 14, 16 and 18. Mirrors 16 and 18 are generally fixed, and one of these mirrors may be semi-transparent in order to allow light to leave the resonator and fall upon photodetectors (not shown and external to the path) for signal processing in order measure rotation of the gyroscope. When the signals are subtracted during the electronic processing to remove the Faraday bias, the scale factor of the gyroscope is doubled over the conventional ring laser gyroscope. At least one of the other mirrors 12 and 14 are transducer driven mirror assemblies which are used to effectuate pathlength control. A Faraday element 15 is also present in the optical path 10 in order to effectuate non reciprocal splitting of pairs of left circularly polarized (LCP) and right circularly polarized (RCP) light beams. The multioscillator ring laser gyroscope contains the two gyroscopes (GYRO 1 and GYRO 2 of FIG. 1B) symbolized by their respective gain lines 22, 24, 26, and 28 under the atomic spectra resonant gain profile 20. Reciprocal splitting between left circularly polarized (LCP) and right circularly polarized (RCP) light beams is accomplished by the non-planar geometric configuration of the mirrors 12, 14, 16, and 18, shown in an exaggerated form in FIG. 1A as a quadrilateral optical path split (the broken line connecting mirrors 14 and 16). The multioscillator ring laser gyroscope uses the Faraday element 15 within the cavity (or, alternatively, a magnetic field on the gain plasma) to provide a phase shift between the counter propagating waves to prevent mode locking. With reference to FIG. 1B, the non-planar ray path reciprocally rotates the polarizations of the counterpropagating light beams by many degrees yielding the necessary high purity circular polarization. This splitting is known as reciprocal splitting and typically is in the range of 100 MHz. By placing a Faraday element 15 in the beam path of a nonplanar ring laser gyroscope, and when the proper magnetic field is applied to the Faraday glass element, nonreciprocal splitting of each gyroscope is achieved. At least four modes are produced: a left circularly polarized anti-clockwise frequency 22 ($L_a$), a left circularly polarized clockwise beam 24 ($L_c$), a right circularly polarized clockwise beam 26 ($R_c$), and a right circularly polarized anticlockwise beam 28 ($R_a$). The Faraday splitting between clockwise and anti-clockwise modes is about 1 MHz.

Although a multioscillator ring laser gyroscope provides a strap-down method of providing rotation measurement which is not subject to low rotation rate mode locking and therefore needs no dither mechanism, all ring laser gyroscopes are prone to optical pathlength changes due to thermal expansion of the gyroscope frame. Therefore, the optical pathlength of the gyroscope must be controlled and monitored to make certain that the resonant cavity operates at the same gain line of the atomic spectra gain curve. Due to the multiplicity of their applications, ring laser gyroscopes are required to operate over a wide temperature range, such as −55° C. to +70° C. Since the laser light beam emitted by the active gain region of the gyroscope propagates around the ring laser by means of reflection off the surfaces of at least 3 mirrors, thermal expansion of the frame and mirrors will cause a significant change in cavity resonant wavelength. It is therefore necessary to provide a pathlength control mechanism to slightly vary the optical pathlength of the gyroscope ring resonator in order to preserve the fundamental resonance of the cavity to which all sensing instrument components of the gyroscope are calibrated. Even where low expansion glass materials are used for building a monolithic frame which supports to optical cavity path between the mirrors, the pathlength of a ring laser gyroscope will still experience a substantial change in path length during temperature changes. This change can be as much as 5 wavelength or more at the resonant frequency of the light produced by the gaseous active medium, such as a helium-neon mix. In an active path length control system, the changes in pathlength due to thermal expansions and contractions are monitored by detector electronics and provide feedback information for driving one or more piezo-electric transducers. However, the standard active pathlength control assembly does not provide sufficient axial movement of the mirror surface over a sufficient range to accommodate the dynamic changes due to temperature found in a multioscillator ring laser gyroscope.

The applicants are aware of certain disclosures by Raytheon Corporation of Lexington, Mass. directed to a Passive Pathlength Control for Ring Laser Gyroscopes and a High Performance Hybrid Pathlength Control, as well as Laser Pathlength Tuning Elements, which are the subject of a United States Patent Application entitled Passive Pathlength Control Mirror For Laser filed Dec. 18, 1990, as Ser. No. 07/630,213. The assignee of this application is a Licensee of these disclosures from Raytheon Corporation. These disclosures (which were written before the conception of the present invention by the applicants herein) are directed to a passive pathlength control assembly which performs pathlength control solely by making use of thermally expansive materials to achieve such control. The Hybrid Pathlength Control disclosure suggests the use of at least one such passive controller and at least one other piezo-electric active controller for the same optical path of a multioscillator ring laser gyroscope instrument.

SUMMARY OF THE INVENTION

What is needed is a pathlength control assembly for a ring laser gyroscope that is effective over the entire dynamic range of change in the pathlength of a multioscillator ring laser gyroscope. Disclosed herein is an improved pathlength control assembly for use in a multioscillator ring laser gyroscope, which may comprise a mirror, a mirror mount for mounting the mirror on an axially deflectable membrane, and a mirror post coupled to the deflectable membrane. The improved pathlength control assembly also has at least one transducer and a supporting plate for supporting the transducer. A thermally expansive driver post for axially driving the mirror post is used in conjunction with the transducer, which transducer is bonded onto the supporting plate. In this manner, the active transducer may move the plate for axially deflecting in response to an electronic input signal. The thermally expansive driver post passively displaces the mirror post, the membrane, and the mirror, while the transducer actively displaces the driver post and mirror post. In this manner, the combined action of the active transducer driven controller and the thermally expansive driver post provides both passive and active mirror displacement functions in order to achieve the full axially driving range needed to drive said mirror post and mirror over a relatively wide range needed to properly operate a multioscillator ring laser gyroscope. The passive thermally expansive driver post is preferably comprised of a material having a relatively high coefficient of thermal expansion. This material may be selected from the group of materials consisting of BK7 Glass, FK 5 Glass, FK 52 Glass and Aluminum. Low expansion materials such as Cervit, Zerodur, and ULE glass may be used to make the mirror mount and the transducer supporting plate.

The thermally expansive driver post, through thermal expansion, provides compensation to the thermal expansion effects upon the Faraday element; since, the driver post expands with an effect opposite to that of the thermal expansion of the Faraday element.

BRIEF DESCRIPTION OF THE DRAWINGS

FIG. 2A is a cross-sectional view of a preferred embodiment of the pathlength control assembly for a multioscillator ring laser gyroscope of this invention.

FIG. 2B is a perspective isometric view of a preferred embodiment of the pathlength control assembly for a multioscillator ring laser gyroscope of this invention.

FIG. 4A is a cross-sectional view of an another alternative embodiment of the pathlength control assembly for a multioscillator ring laser gyroscope of this invention.

FIG. 4B is a perspective isometric view of the alternative embodiment of the pathlength control assembly of FIG. 4A for a multioscillator ring laser gyroscope of this invention.

FIG. 4C is an exploded isometric view of the pathlength control assembly of FIG. 4B.

DETAILED DESCRIPTION OF THE PREFERRED EMBODIMENT

Figure 2C:
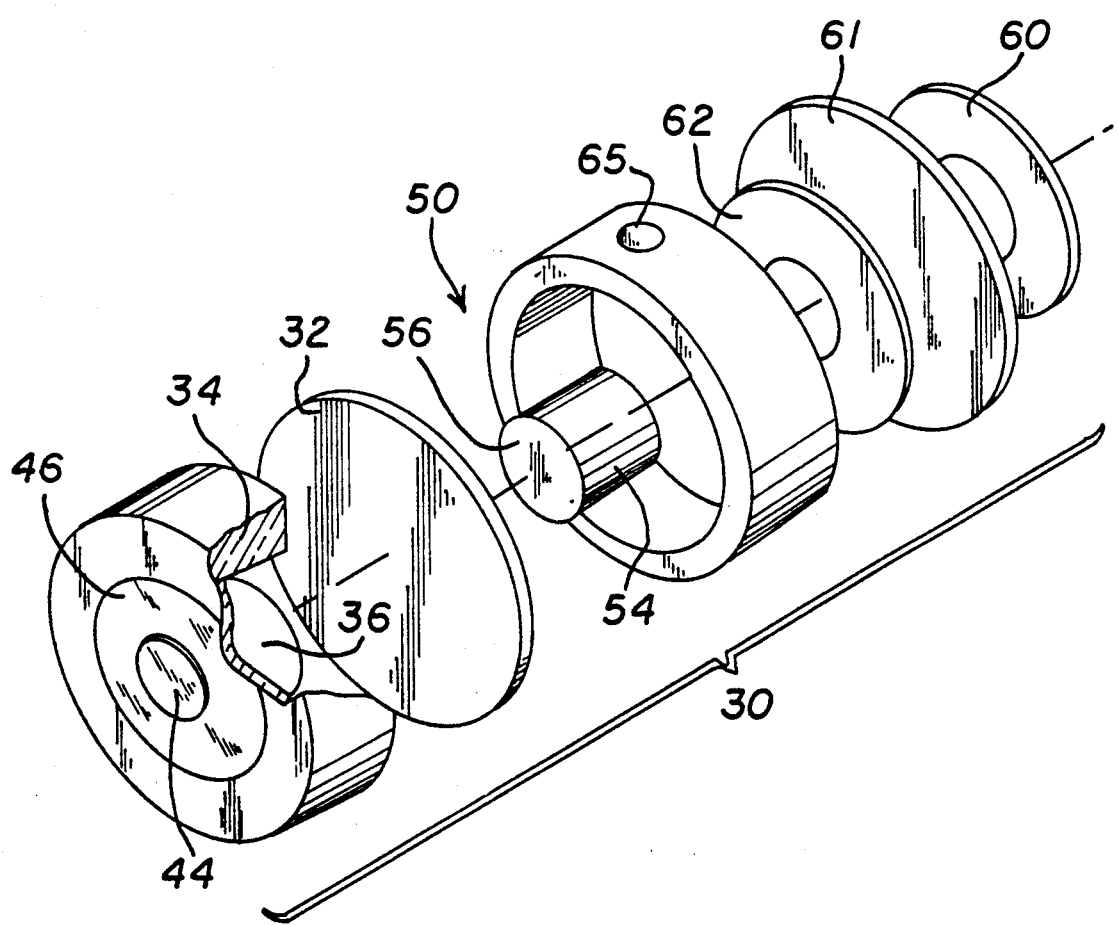
FIG. 2C is an exploded isometric view of the pathlength control assembly of FIG. 2B.

With reference to FIGS. 2A through 2C, there is disclosed a preferred embodiment of the Pathlength Control Assembly for Ring Laser Gyroscopes of this invention. It can be seen that the basic components of the path length controller mirror assembly 30 include a membrane-type mirror housing 38 and a backing plate 32, which serves to support the mirror housing 38 and is sandwiched between the mirror housing 38 and the driver body 50. The housing 38, supports the mirror 44, which is mounted on the diaphragm membrane 46. This mirror 44 is positioned facing into the gyroscope frame body 40 for reflecting light along the light beam path 67 off of the mirror's surface. The housing 38 has an outer cylinder 34 and a central mirror post 36. The annular surface of the mirror post 36 and the outer annular surface of the outer cylinder 34 are flush against the circular backing plate 32.

The driver body 50 includes a driver post 54, which during activation of the cavity length control assembly causes the driver post 54 and forward surface 56 to move axially along the direction shown at 42 (FIG. 2B). Such axial movement of the driver post 54 causes axial movement by the mirror post 36 against the flexible mirror membrane 46, thereby allowing axial movement of the mirror 44 between a rest position and a flexural position 44' (shown in phantom). FIG. 2C additionally shows that the driver body 50 has an outer surface which is flush against the backside of the backing plate 32.

Positioned on either side of a driver plate 61, at the back end of the driver body 50, are two piezo-electric elements 60 and 62. The piezo-electric element 62 has an inner annulus to accommodate placement of the driver post 54 of the driver body 50. The piezo-electric elements 60 and 62 are secured and bonded to the front and back surfaces, respectively, of the driver plate 61 by the use of epoxy cement. These elements are often bimetallic or bimorphic, such that when they are alternatively polarized by applying a voltage thereto from electrical terminals 64 and 66 along electrical wiring 63A and 63B (which may be passed through the air vent hole 65), the driver body 50 and driver post 54 move axially along the central axis of the driver body 50, back and forth as needed in the axial direction 42. Such movement results in positioning the backing plate 32 to a new position 69, and moving the mirror membrane 46 of the mirror housing 38 to a new position 68, all of which results in the desired axial movement 42 of the mirror surface 44 out to 44'.

Preferably (except for the piezo-elements 60 and 62 and the driver post 54), all the components which make up the assembly 30 (like the mirror housing 38, the backing plate 32, and the driver body 50) should be made from the same material to decrease the effects of thermal expansion. Materials of relatively low thermal expansion coefficients such as Cervit, Zerodur, ULE (Ultra Low Expansion) Glass are among the most desirable to use to manufacture the pathlength control assembly 70. In this manner, the assembly 70 is able to operate over a wide temperature range from −55° C. through at least +70° C. Due to the wider range needed to properly operate a multioscillator ring laser gyroscope, the driver post 54 in the preferred embodiment is made from materials showing a relatively higher thermal expansion coefficient, including BK7 Glass, FK 5 Glass, FK 52 Glass, and Aluminum. In this manner, the driver post 54 can operate as a passive pathlength control element which extends the range of the active piezo-electric element operation.

In operation, an electrical stimulus is provided as shown along the electrical wiring 63A and 63B. One will note that the piezo-elements 60 and 62 are charged so that upon application of voltage, one element expands and the other element contracts to bow in an axial direction along the central axis 42 of the pathlength control assembly 30. The piezo-elements 60 and 62, acting with the driver plate 61 and compensating element, mirror post 54, then cause the driver plate to bow and move the central mirror post 36 in an axial direction 42. A vent hole 65 (FIG. 2A) is provided to allow pressure equalization within the pathlength control assembly 30 and to also allow passage of the wiring 63A and 63B from the piezo-elements 60 and 62 from the inside of the driver body 50 to the outer surface for electrical connection at the electrical power supply terminals 64 and 66 outside the assembly 30.

Movement of the central mirror post 36 of the mirror housing 38 causes the reflective mirror surface 44 to move back and forth along the central axis of the mirror assembly 30, thereby allowing active cavity or optical pathlength control to be accomplished. It shall be understood that the driver post 54 is needed to accomplish the desired axial translation, and that such translation requires a pathlength control assembly 30 of hybrid design.

An effective technique to test the hybrid pathlength control mirror assembly of this invention is to perform a "mode scan". A mode scan requires the application of no electrical voltage to the pathlength control piezo-electric elements 60 and 62, while simultaneously monitoring over a temperature range the outputs of the light intensity emitted from the ring laser gyroscope through a semi-transparent corner mirror. Under such a test, the pathlength control mirrors move through a minimum number of modes. The dynamic range over temperature of the hybrid design is increased by using the driver post 54 as a compensating element.

By combining both passive and active pathlength control in the pathlength controller mirror assembly 30 of this application, one shows an inherent simplicity in such pathlength control assembly configurations in comparison with previous designs.

Figure 3A:
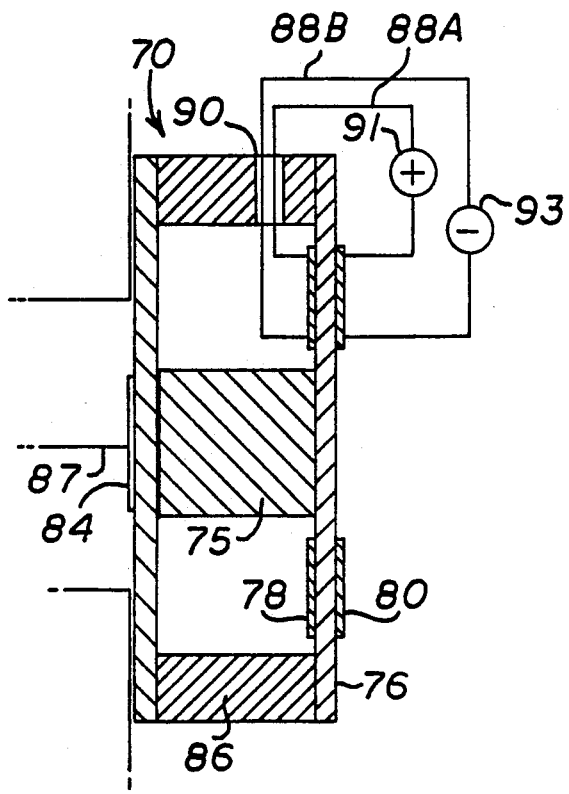
FIG. 3A is a cross-sectional view of an alternative embodiment of the pathlength control assembly for a multioscillator ring laser gyroscope of this invention.
Figure 3B:
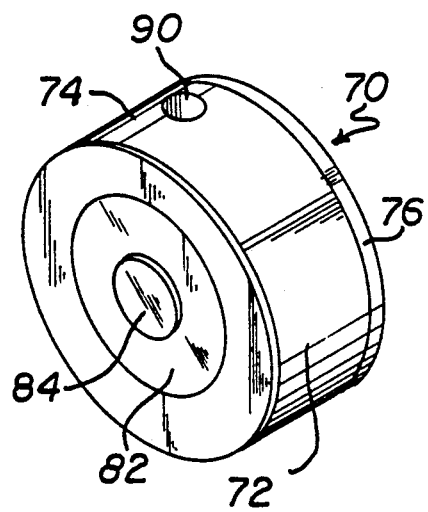
FIG. 3B is a perspective isometric view of the alternative embodiment of the pathlength control assembly of FIG. 3A for a multioscillator ring laser gyroscope of this invention.
Figure 3C:
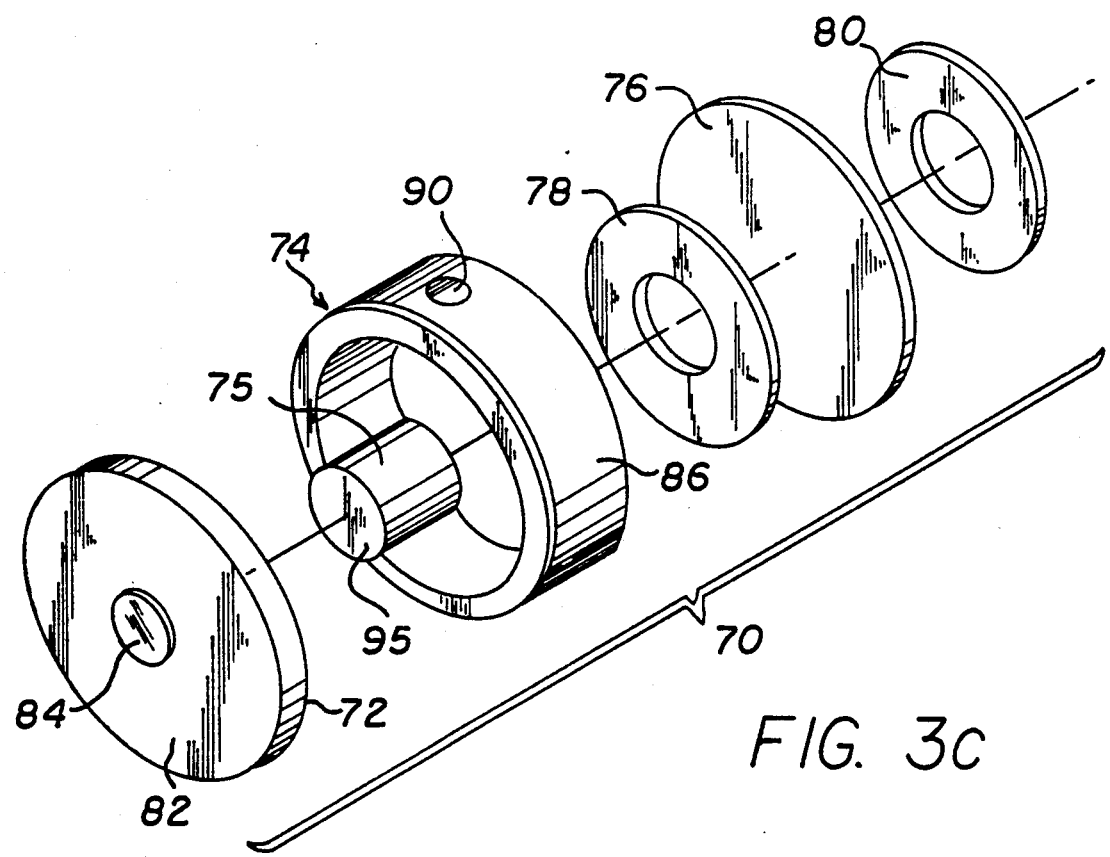
FIG. 3C is an exploded isometric view of the pathlength control assembly of FIG. 3B.

With reference to FIGS. 3A through 3C, the mirror housing 74 include a forward surface which supports the mirror surface 84 and acts as a membrane surface 82. The membrane surface 82 also acts as a mirror substrate for the mirror surface 84. The mirror housing 74 has an outer cylinder 86 which provide symmetry and balance to the path length control assembly 70.

It can be seen that the basic components of the pathlength control assembly 70 include a mirror housing 74 and a backing plate and driver 76, which serves in the dual capacity as a supporting plate and driver and which is sandwiched between the piezo-electric elements 78 and 80. The piezo-electric element 78 has an inner annulus to accommodate placement of the driver post 75 of the mirror housing 74. The piezo-electric elements 78 and 80 are secured and bonded to the front and back surfaces, respectively, of the backing and driver plate 76 by the use of epoxy cement.

The mirror housing 74 is affixed to a forward mirror and diaphragm supporting plate 72 which supports the mirror surface 84 and acts as a membrane surface 82. The membrane surface 82 also acts as a mirror substrate for the mirror surface 84. The mirror housing 74 has an outer cylinder 86 which provide symmetry and balance to the path length control assembly 70.

As in the preferred embodiment of FIGS. 2A through 2C, the driver post 75 may be made from a relatively higher thermal expansion coefficient material to allow the driver post 75 to compensate for thermal expansion and provide a passive cavity length sub-component to the pathlength controller assembly 70.

In operation, an electrical stimulus is provided as shown along the electrical wiring 88A and 88B. One will note that the piezo-elements 78 and 80 are charged so that upon application of voltage, one element expands and the other element contracts to bow in an axial direction along the central axis 87 of the pathlength control assembly 70. The piezo-elements then cause the backing plate to bow and move the mirror post 75 in an axial direction. A vent hole 90 is provided to allow pressure equalization within the pathlength control assembly 70 and to also allow passage of the wiring 88A and 88B from the piezo-elements 78 and 80 from the inside of the housing 74 to the outer surface for electrical connection with the electrical power supply terminals 91 and 93 outside the assembly 70. It should be noted that only a single vent hole through the mirror housing 74 is needed to accomplish the pressure equalization required, (when the mirror membrane 82 moves in and out along the axial direction of the assembly 70).

Movement of the forward surface 95 of the mirror post 75 of the mirror housing 74 causes the reflective mirror surface 84 to move back and forth along the central axis of the mirror assembly 70, thereby allowing active cavity or optical pathlength control to be accomplished. It shall be understood that heretofore an additional driver body 50 (of FIG. 3 of U.S. Pat. No. 4,824,253) was needed to accomplish the desired axial translation that the invention of this application accomplishes by using the backing plate 76 in a dual capacity such as a driver and piezo-element support plate. Such design allows a considerable cost savings due to the elimination of the driver body 50 component.

A particularly deleterious error source in the performance of any pathlength controller assembly is the mirror tilt, i.e., the mirror motion in directions other than its perpendicular axis. As it was heretofore taught in the art (i.e. U.S. Pat. No. 4,861,161 to Ljung), such mirror tilt can cause bias shifts in the ring laser gyroscope output under changing temperature.

Figure 1A:
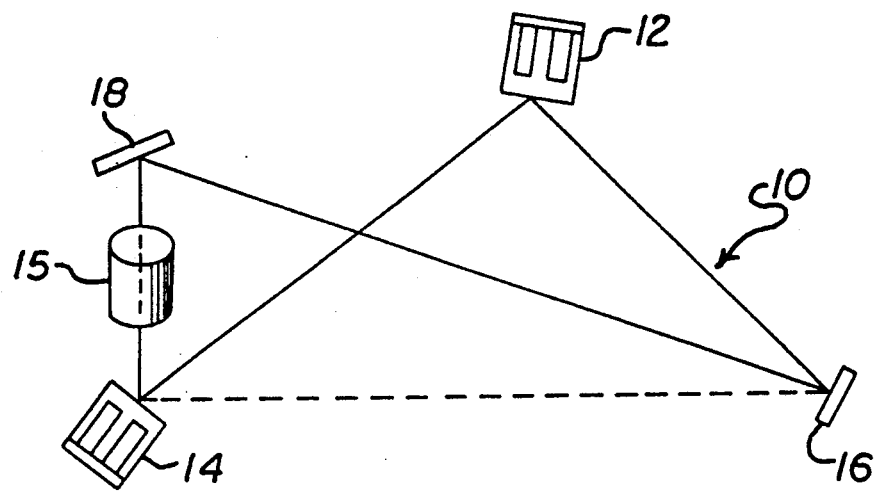
FIG. 1A is a prior art drawing showing a schematic view of a multioscillator ring laser gyroscope instrument illustrating the operation of the cavity length control system of this invention.
Figure 1B:
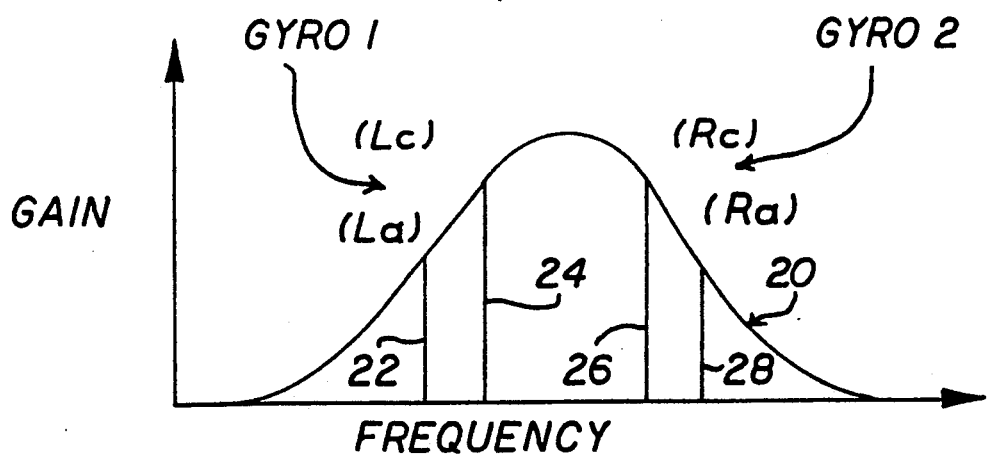
FIG. 1B is a PRIOR ART graphic representation illustrating the atomic gain medium curve of the multioscillator ring laser gyroscope of FIG. 1A operating at the resonant frequencies of a gaseous medium ring laser gyroscope.

An effective technique to test the pathlength control mirror assembly for mirror tilt is to perform a "mode scan". A mode scan comprises the application of full electrical voltage to the pathlength control piezo-electric elements 78 and 80, while simultaneously monitoring of the outputs of light intensity detectors placed adjacent one of the output mirrors of the ring laser gyroscope. Under such a test, the pathlength control mirrors move through their maximum number of design modes, and a trace of the output signals from the photo detectors show a curves like the one depicted in FIG. 1B (the gain profile). Any changes in the maxima of the successive gain profiles under a mode scan would be indicative of mirror tilt.

Pathlength control assembly and mirror using a dual function backing and driver plated 76 have been tested for mirror tilt errors (for two mode gyroscopes) according the mode scan method as described heretofore. In a manner distinct from the teachings of the prior art (including U.S. Pat. No. 4,861,161), the pathlength control assembly of this application shows an inherent simplicity in comparison with previous designs. This simplicity of design allowed the applicant's invention to test quite successfully with regard to mirror tilt. If one were to build and test a number of pathlength control assemblies according to the teachings of FIGS. 3A and 3C, such assemblies, after integration into a ring laser gyroscope, would undergo a variety of gyroscope performance tests, including the mode scan test for pathlength controller mirror tilt. Such test results would show that over a scan of several modes there was no measurable change in the maxima of the gain profiles traced during the mode scan.

With reference to FIGS. 4A through 4C, there is shown a pathlength control assembly 100 which is a close alternative to the embodiment shown in FIGS. 3A through 3C. The pathlength control assembly 100 is comprised of a mirror housing 102, which housing 102 includes a mirror membrane 104 supporting a mirror surface 106. Like the embodiment disclosed in FIGS. 3A through 3C, there is no separate driver body; rather, a separate driver 110, working together with its driver post 112, serves the dual function of driver and supporter for the piezo-electric elements 114 and 116. Like the previously described embodiments, the piezo-electric elements 114 and 116 provide forward axial motion to the driver 110, its driver post support plate 108, and the driver post 112. The piezo-elements are energized by an external electrical power supply through terminals 117 and 119 along electrical wiring 111A and 111B, which may be threaded through the vent hole 115. When energized, the forward surface 113 of the driver post 112 is pressed against the mirror post pedestal 118, causing the mirror membrane 104 to move, carrying forward the mirror surface 106 and thereby performing cavity length control of the ring laser gyroscope. The embodiment of the invention shown in FIGS. 4A through 4C may be distinguished from the embodiment of FIGS. 3A through 3C, in that rather than having a single driver post 75 that is affixed to the backing plate 76 and the mirror supporting plate 72, the mirror housing 102 is integral with the mirror post pedestal and forms a single housing made from a material of low coefficient of thermal expansion. Also, the driver 110 is a single unitary component made from a high thermal coefficient of expansion material and comprises the driver post support plate 108 and the driver post 112. Thus, a more rigid structure is provided, and, both the driver post 112 and the support plate 108 are formed from high thermal expansion material.

Figure 5A:
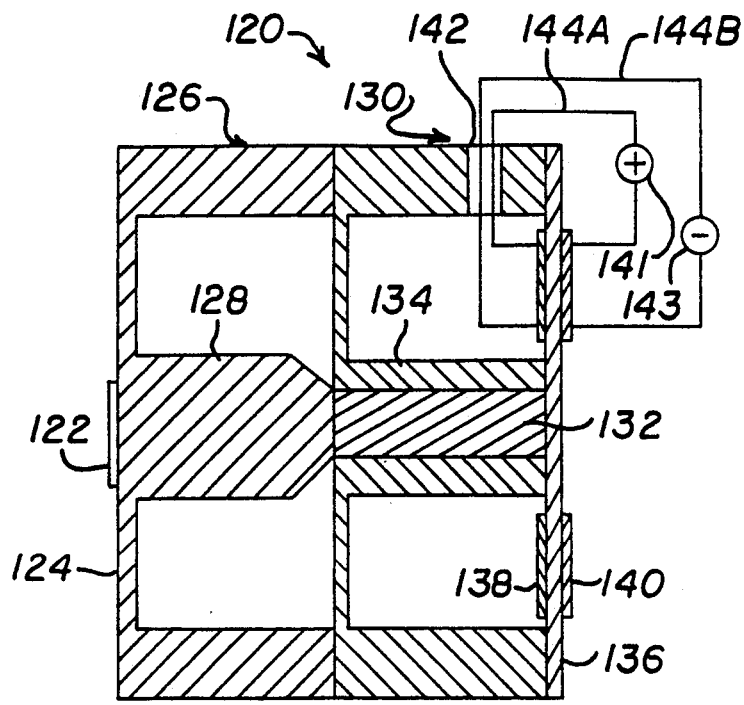
FIG. 5A is a cross-sectional view of yet another alternative embodiment of the pathlength control assembly for a multioscillator ring laser gyroscope of this invention.
Figure 5B:
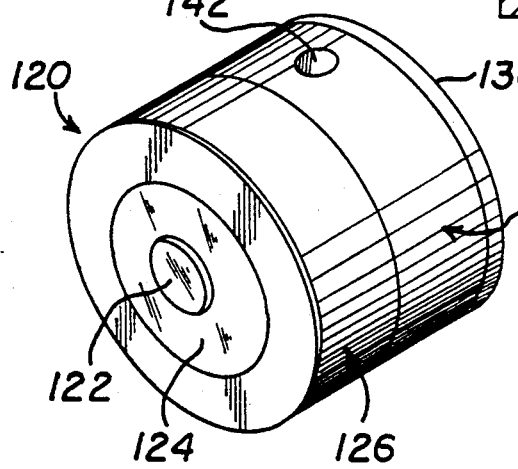
FIG. 5B is a perspective isometric view of the alternative embodiment of the pathlength control assembly of FIG. 5A for a multioscillator ring laser gyroscope of this invention.
Figure 5C:
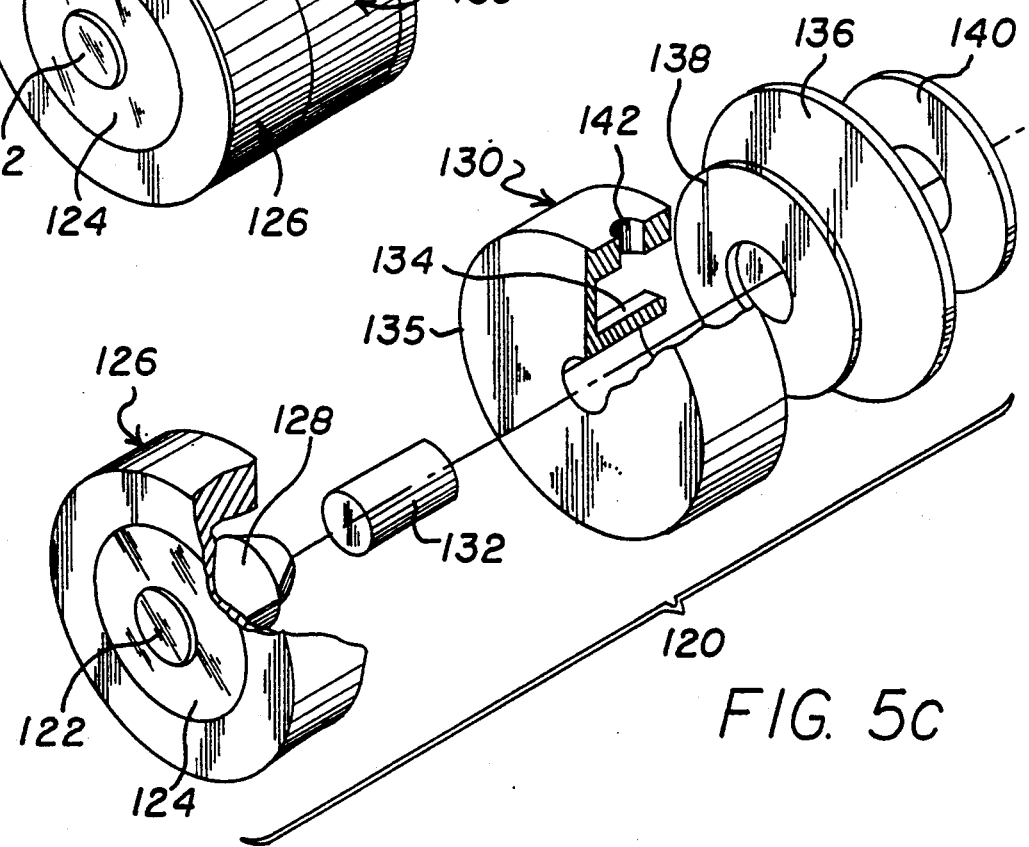
FIG. 5C is an exploded isometric view of the pathlength control assembly of FIG. 5B.

With reference to FIGS. 5A through 5c, a path length control assembly 120 is shown generally and comprises a mirror housing 126, a driver 130, and a backing plate and driver 136. The mirror housing includes a flexible mirror membrane 124 and mirror surface 122, as well as a tapered mirror post 128 integral with the forward surface of the housing 126. The driver 120 is comprised of a driver expansion plug 132, which is movably telescoped within the driver barrel chamber 134. The backing plate and driver 136 support the piezo-electric elements 138 and 140 which are driven by an external power supply from terminals 141 and 143 along wires 144A and 144B threaded through the vent hole 142.

In operation, as the piezo-elements 138 and 140 are activated, the backing plate and driver 136 tends to bow forward driving the compensating element, the driver expansion plug 132, axially forward against the tapered mirror post 128. Also stabilization is maintained at the interface of the forward surface 135 of the driver 130 as it is pressed against the outer cylindrical surface of the mirror housing 126. The driver expansion plug 132 also provides passive cavity length control, since it may be made from a high coefficient of expansion material such as aluminum or BK 7 Glass. The tapered mirror post 128 provides a distributed and uniform axial force to the mirror surface 122 as the mirror membrane 124 is flexed. The design of the embodiment of FIGS. 5A through 5C provides additional stability and prevents mirror tilt that otherwise might be associated, in the past, with cavity or pathlength control assemblies.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, any material exhibiting a high coefficient of thermal expansion would be useful to act as the compensating element of the hybrid pathlength controller of this invention. Also, while the pathlength control assembly of the disclosed invention may be preferably used in a multioscillator ring laser gyroscope, it is also useful for any ring laser gyroscope, any ring laser, or to stabilize a linear laser. Thus, alternate embodiments having substantially equivalent functions or structures are intended to be comprehended within the scope of the appended claims.

What is claimed is:

1. In a ring laser gyroscope, a pathlength control assembly, comprising:
   a mirror;
   means for mounting said mirror on an axially deflectable membrane;
   a mirror post coupled to said deflectable membrane;
   at least one transducer means;
   means for supporting said transducer means;
   axially-directed, passive thermally expansive means for axially driving said mirror post;
   said at least one transducer means, bonded onto said supporting means, for axially deflecting said thermally expansive driving means in response to an electronic input signal;
   said passive thermally expansive driving means passively displacing said mirror post, said membrane, and said mirror;
   said at least one transducer means actively displacing said mirror post, in conjunction with said passive thermally expansive driving means;
   whereby, said passive thermally expansive during means, in conjunction with said at least one transducer means, provided both passive and active mirror displacement functions in order to achieve the full axially driving range needed to drive said mirror post and mirror over a relatively wide range needed to properly operate a ring laser gyroscope.

2. The pathlength control assembly of claim 1, wherein:
   said axially-directed, passive thermally expansive driving means is made from a material having a relatively high coefficient of thermal expansion.

3. The pathlength control assembly of claim 2, wherein:
   said material having a relatively high coefficient of thermal expansion is a material selected from the group consisting of BK7 Glass, FK 5 Glass, FK 52 Glass and Aluminum, and,
   said mirror mounting means and said transducer supporting means are made from a low temperature expansive material selected from the group consisting of Cervit, Zerodur, and ULE glass;
   whereby, said pathlength control assembly is able to operate over a wider temperature range.

4. The pathlength control assembly of claim 2, wherein:
   said axially-directed, passive thermally expansive driving means is a thermally expansive cylindrical driver post.

5. The pathlength control assembly of claim 4, wherein:
   said thermally expansive cylindrical driver post is made from a material selected from the group consisting of BK7 Glass, FK 5 Glass, FK 52 Glass and Aluminum.

6. The pathlength control assembly of claim 4, wherein: said at least one transducer means is a set of two piezo-electric elements, each of said elements bonded onto two opposite sides of said supporting means, for axially deflecting said thermally expansive driving means in response to an electronic input signal, said piezo-electric elements being symmetrically disposed about said supporting means and of equal size.

7. The pathlength control assembly of claim 2, wherein:
   said axially-directed, passive thermally expansive driving means is a single integral thermally expansive driver post support plate and cylindrical driver post.

8. The pathlength control assembly of claim 7, wherein:
   said thermally expansive cylindrical driver post is made from a material selected from the group consisting of BK7 Glass, FK 5 Glass, FK 52 Glass and Aluminum.

9. The pathlength control assembly of claim 7, wherein: said at least one transducer means is a set of two piezo-electric elements, each of said elements bonded onto two opposite sides of said driver post support plate, for axially deflecting said thermally expansive driving means in response to an electronic input signal, said piezo-electric elements being symmetrically disposed about said supporting means and of equal size.

10. An improved ring laser gyroscope, said ring laser gyroscope comprising:
- a resonant optical cavity formed in a ring configuration, said ring configuration defining a closed optical path;
- said resonant optical cavity having a pathlength control assembly for adjusting the optical path length in response to changes in said path length;
- said pathlength control assembly, further comprising:
- a mirror mounted on a mirror housing, said mirror housing including an axially deflectable membrane;
- a mirror post coupled to said deflectable membrane;
- a mirror driver body having a passive drive post;
- said driver post being manufactured from a relatively high coefficient of thermal expansion material;
- a backing plate;
- at least one piezo-electric element, bonded onto said backing plate, for axially deflecting said backing plate in response to an electronic input signal;
- said driver post, through thermal expansion, passively, axially, driving said mirror post and said mirror;
- said backing plate and piezo-electric element actively driving said mirror post and said mirror;
- whereby, together said driver post and said backing plate serve to drive said mirror post and mirror over a wide temperature range.

11. The ring laser gyroscope of claim 10, wherein: said resonant optical cavity formed in a ring configuration includes a Faraday element providing non-reciprocal rotation of pairs of counterpropagating light beams, said Faraday element being sensitive to thermal changes, which cause expansion of said Faraday element; and,
said driver post, through passive thermal expansion, providing compensation to the thermal expansion effects upon the Faraday element, said driver post expanding with an effect opposite to the thermal expansion of the Faraday element.

12. The ring laser gyroscope of claim 10, wherein:
said mirror post is tapered towards its rear and interfaces said passive driver post; and,
said driver post is a driver expansion plug telescoped within a tapered driver barrel chamber of said mirror driver body.

13. The pathlength control assembly of claim 12, wherein:
said driver expansion plug only is made from a material having a relatively high coefficient of thermal expansion, said material selected from the group consisting of BK7 Glass, FK 5 Glass, FK 52 Glass and Aluminum; and,
the remainder of said driver body, including the driver barrel chamber is made from a relatively low temperature expansive material selected from the group consisting of Cervit, Zerodur, and ULE glass;
whereby, said pathlength control assembly is able to operate over a wider temperature range.

14. The pathlength control assembly of claim 12, wherein: said at least one piezo-electric element is a set of two piezo-electric elements, each of said elements bonded onto two opposite sides of said backing plate, for axially deflecting said thermally expansive driving means in response to an electronic input signal, said piezo-electric elements being symmetrically disposed about said backing plate and of equal size.

* * * * *